Feb. 18, 1936.   J. A. ROBERTS   2,031,281
AUTOMOBILE DOOR LOCKING MECHANISM
Filed Feb. 25, 1935   2 Sheets-Sheet 1
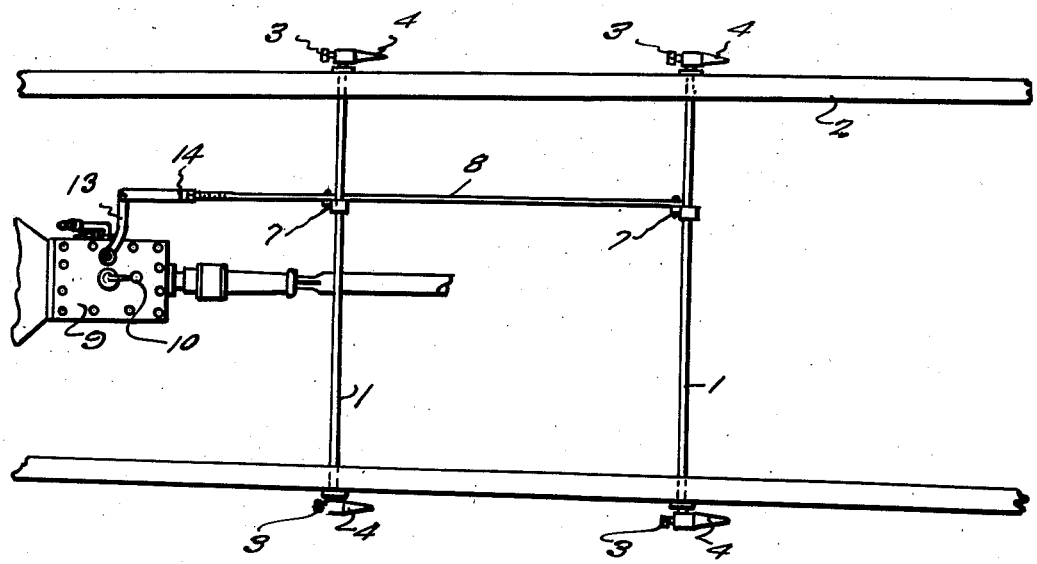
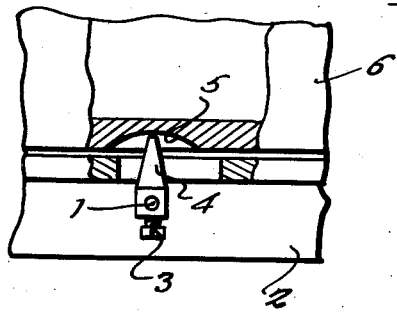
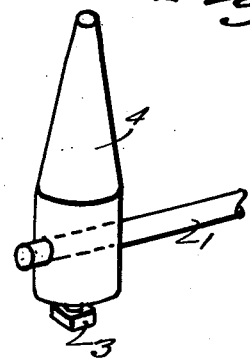
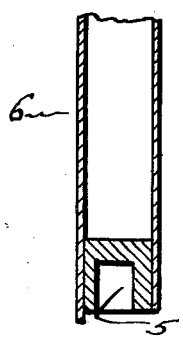
Inventor
J. A. Roberts
By Clarence A. O'Brien
Attorney

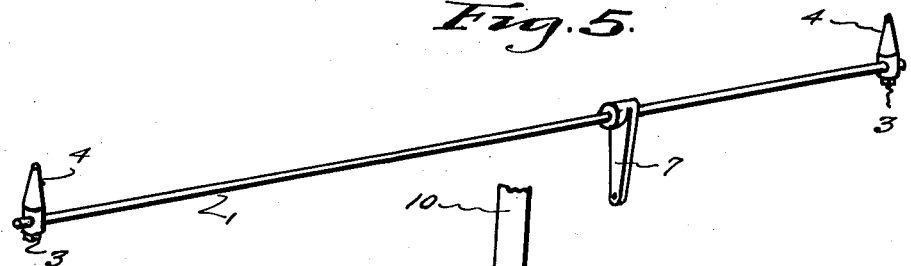
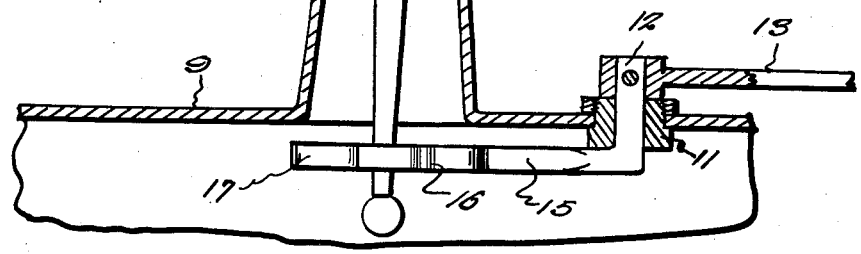
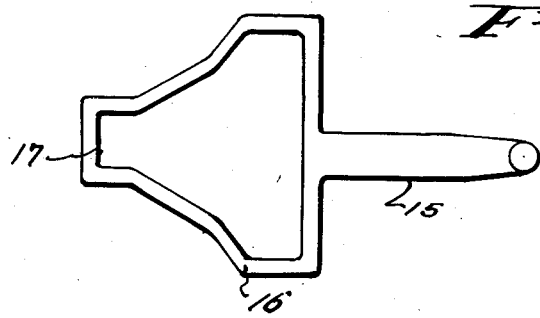

Patented Feb. 18, 1936

2,031,281

UNITED STATES PATENT OFFICE 2,031,281

AUTOMOBILE DOOR LOCKING MECHANISM

James A. Roberts, Douglas, Ga.

Application February 25, 1935, Serial No. 8,174

2 Claims. (Cl. 180—82)

The present invention relates to new and useful improvements in automobile door locking mechanisms and has for its primary object to provide, in a manner as hereinafter set forth, a novel construction, combination and arrangement of parts through the medium of which all of the doors of the vehicle will be automatically and simultaneously locked when the usual gear shift lever is moved into third or high speed position.

Another very important object of the invention is to provide novel means for operatively connecting the mechanism to the gear shift lever for actuation thereby.

Other objects of the invention are to provide a door locking mechanism of the character described which will be comparatively simple in construction, strong, durable, highly efficient and reliable in operation, compact and which may be manufactured and installed at low cost.

All of the foregoing and still further objects and advantages of the invention will become apparent form a study of the following specification, taken in connection with the accompanying drawings wherein like characters of reference designate corresponding parts throughout the several views, and wherein:—

Figure 1 is a view in top plan of the invention.

Figure 2 is a fragmentary view in vertical section through the lower portion of an automobile door, showing one of the locking elements operatively engaged therewith.

Figure 3 is a vertical sectional view taken transversely through the lower portion of an automobile door, showing the pocket therein for the reception of a locking member.

Figure 4 is a detail view in perspective of one of the locking members.

Figure 5 is a perspective view of one of the rocker shafts with the locking members mounted thereon.

Figure 6 is a view in vertical transverse section through the upper portion of a transmission housing, showing the means for operatively connecting the mechanism to the gear shift lever.

Figure 7 is a detail view in top plan of the arm which is operatively engaged by the gear shift lever.

Referring now to the drawings in detail, it will be seen that the embodiment of the invention which has been illustrated comprises a pair of rocker shafts 1 which are journaled transversely in the frame 2 of the automobile. Secured by set screws on the outer end portions of the rocker shafts 1 are adjustable tapered locking arms 4 which are engageable in substantially segmental slots or pockets 5 which are provided therefor in the bottoms of the automobile doors 6. This is shown to advantage in Figures 2 and 3 of the drawings. Fixed on intermediate portions of the rocker shafts 1 are depending arms 7 to the lower end portions of which a rod 8 is pivotally connected.

Referring now to Figure 6 of the drawings, it will be seen that the reference numeral 9 designates a housing in which a gear shift lever 10 is mounted, as usual, for substantially universal swinging movement. Mounted in an opening which is provided therefor in the housing 9 is a bearing 11 in which a vertical shaft 12 is journaled. Fixed on the upper end portion of the shaft 12 is an arm 13 to the free end portion of which the longitudinal rod 8 is coupled by an adjustable connection 14 (see Figure 1).

Integral with the lower end of the vertical shaft 12 and operable within the housing 9 is an arm 15 which terminates, at its free end, in a frame 16 in which the gear shift lever 10 is engaged. The frame 16 is formed to provide an extension or pocket 17 for the reception of the lever 10 when said lever is to be moved to either second or third speed position.

It is thought that the operation of the apparatus will be readily apparent from a consideration of the foregoing. The gear shift lever 10 is free to move into first and reverse speed positions without actuating the arm 15. However, when the gear shift lever is moved laterally in the usual manner preparatory to being moved to second or third speed position, the lower end portion of said lever is engaged in the pocket 17. Then, when the gear shift lever is moved to high or third speed position, the arm 15 is actuated thereby in a horizontal plane and the rocker shafts 1 are actuated to engage the locking members 4 with the doors. In addition to positively locking the doors in closed position, the adjustably mounted locking arms 4 materially reduce or substantially eliminate rattling of said doors. The apparatus may be expeditiously installed for operation on automobiles which are already in use without the necessity of making material alterations.

It is believed that the many advantages of a door locking mechanism for automobiles constructed in accordance with the present invention will be readily understood, and although a preferred embodiment of the invention is as illustrated and described, it is to be understood that changes in the details of construction and in the combination and arrangements of parts may be resorted to which will fall within the scope of the invention as claimed.

What is claimed is:—

1. In an automobile including a change speed transmission and a shift lever for actuating said transmission, means for locking the doors of the automobile, said means including rocker shafts journaled transversely on the automobile, locking members mounted on the end portions of said shafts and operatively engageable with the doors, a rod operatively connected to the rocker shafts for actuating said rocker shafts in unison, a shaft journaled vertically in the transmission housing, an arm fixed on the second named shaft and operable in the transmission housing, said arm including a frame in which the gear shift lever is operable, said frame comprising a pocket for the reception of the lever when said lever is moved to high speed position, said pocket constituting means for operatively connecting the arm to the lever for actuation thereby, and an arm fixed on the second-named shaft and pivotally connected to the rod for actuating the rocker shafts.

2. In an automobile including a change speed transmission and a shift lever for actuating said transmission, locks for securing the doors of the automobile in closed position, an arm mounted for swinging movement in the transmission housing, means on the arm encircling the shift lever and engageable for actuation thereby when said lever is moved to high speed position, and means operatively connecting the locks to the arm for actuation thereby to locking position.

JAMES A. ROBERTS.